(12) United States Patent
Chai et al.

(10) Patent No.: US 10,153,676 B2
(45) Date of Patent: Dec. 11, 2018

(54) ELECTRIC MOTOR HAVING INSULATOR FRAME AND ELEMENTS TO CLOSE WINDING SLOTS

(71) Applicant: JOHNSON ELECTRIC S.A., Murten (CH)

(72) Inventors: Jie Chai, Shenzhen (CN); San Yuan Xiao, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 785 days.

(21) Appl. No.: 14/694,692

(22) Filed: Apr. 23, 2015

(65) Prior Publication Data

US 2015/0311762 A1 Oct. 29, 2015

(30) Foreign Application Priority Data

Apr. 23, 2014 (CN) .......................... 2014 1 0166063

(51) Int. Cl.
| | |
|---|---|
| *H02K 3/24* | (2006.01) |
| *H02K 3/34* | (2006.01) |
| *H02K 3/48* | (2006.01) |
| *H02K 3/38* | (2006.01) |
| *H02K 3/487* | (2006.01) |
| *H02K 3/46* | (2006.01) |
| *H02K 3/32* | (2006.01) |

(52) U.S. Cl.
CPC .............. *H02K 3/345* (2013.01); *H02K 3/325* (2013.01); *H02K 3/32* (2013.01); *H02K 3/34* (2013.01); *H02K 3/38* (2013.01); *H02K 3/46* (2013.01); *H02K 3/48* (2013.01); *H02K 3/487* (2013.01)

(58) Field of Classification Search
CPC ...... H02K 3/32; H02K 3/32534; H02K 3/345; H02K 3/347; H02K 3/38; H02K 3/46; H02K 3/48; H02K 3/487; H02K 9/22
USPC ................................................... 310/214, 215
See application file for complete search history.

(56) References Cited

U.S. PATENT DOCUMENTS

| | | | |
|---|---|---|---|
| 8,853,913 B2 | 10/2014 | Tang | |
| 2003/0057797 A1* | 3/2003 | Kaneko ................. | H02K 1/146 310/216.064 |
| 2004/0189136 A1* | 9/2004 | Kolomeitsev .......... | H02K 1/148 310/216.082 |
| 2010/0079028 A1* | 4/2010 | Turner ................... | H02K 3/487 310/214 |
| 2012/0153767 A1* | 6/2012 | Tang ...................... | H02K 3/345 310/215 |
| 2012/0175992 A1* | 7/2012 | Jang ....................... | H02K 3/325 310/215 |
| 2013/0057107 A1* | 3/2013 | Stretz ..................... | H02K 21/16 310/214 |

(Continued)

*Primary Examiner* — Michael Andrews
*Assistant Examiner* — Rashad Johnson
(74) *Attorney, Agent, or Firm* — Muncy, Geissler, Olds & Lowe, P.C.

(57) ABSTRACT

An electric motor includes a stator and a rotor. The stator includes a stator core, a stator winding, a first insulating frame, a number of first insulating elements, and a number of second insulating elements. The stator core includes a number of teeth. Adjacent teeth form a winding passage defining a winding opening. Each first insulating element is assembled within the corresponding winding passage. Two end portions of each second insulating element are placed over the corresponding winding opening.

10 Claims, 9 Drawing Sheets

(56) References Cited

U.S. PATENT DOCUMENTS

| | | | |
|---|---|---|---|
| 2013/0140936 A1* | 6/2013 | Lin | H02K 3/325 |
| | | | 310/215 |
| 2013/0169085 A1* | 7/2013 | Taema | H02K 3/28 |
| | | | 310/71 |
| 2013/0207506 A1* | 8/2013 | Chang | H02K 3/522 |
| | | | 310/215 |
| 2014/0167555 A1* | 6/2014 | Mims | H02K 1/16 |
| | | | 310/216.001 |
| 2015/0008784 A1* | 1/2015 | Kitaji | H02K 3/34 |
| | | | 310/215 |
| 2015/0061452 A1* | 3/2015 | Nakatake | H02K 3/325 |
| | | | 310/214 |
| 2015/0076935 A1* | 3/2015 | Bulatow | H02K 3/487 |
| | | | 310/45 |
| 2016/0072352 A1* | 3/2016 | Lee | H02K 3/345 |
| | | | 310/214 |
| 2016/0294241 A1* | 10/2016 | Jang | H02K 3/487 |

\* cited by examiner

ELECTRIC MOTOR HAVING INSULATOR FRAME AND ELEMENTS TO CLOSE WINDING SLOTS

CROSS REFERENCE TO RELATED APPLICATIONS

This non-provisional patent application claims priority under 35 U.S.C. § 119(a) from Patent Application No. 201410166063.4 filed in The People's Republic of China on Apr. 23, 2014, the entire contents of which are hereby incorporated by reference.

FIELD OF THE INVENTION

This invention relates to an electric motor and in particular, to a stator assembly for an electric motor.

BACKGROUND OF THE INVENTION

A typical brushless motor has a stator core, a stator winding, a rotor, etc. The stator core includes a ring yoke and a number of teeth extending inwardly from the ring yoke. A winding passage is formed between adjacent teeth. The stator winding is wound about the teeth and is disposed in the winding passages.

In order to insulate the stator winding from the stator core, the stator further includes two insulating frames. The two insulating frames are assembled on the stator core to cover the axial end portions of the stator core, thereby insulating the two axial end portions of the stator core. Moreover, a number of insulating papers are provided to cover inner surfaces of the winding passages to insulate the inner surfaces of the winding passages from the stator winding.

However, this prior structure does not increase a creepage distance between the stator winding and the stator core, which is an important measure of insulation safety, thus an insulation property between stator winding and the stator core has not been improved.

Hence there is a desire for an electric motor with a stator assembly having an improved creepage distance.

SUMMARY OF THE INVENTION

Accordingly, in one aspect thereof, the present invention provides an electric motor having a stator and a rotor rotatable with respect to the stator, the stator comprising: a stator core comprising a yoke, a plurality of teeth extending inwardly from the yoke, each tooth comprising a base and two arm portions circumferentially extending from an end portion of the base in opposite directions, a plurality of winding passages, each winding passage being formed between a respective pair of adjacent teeth and having a winding opening between two adjacent arm portions of the adjacent teeth; a stator winding being wound about the bases of the teeth and received in the winding passages; a first insulating frame assembled on a first axial end portion of the stator core; a second insulating frame assembled on a second axial end portion of the stator core; a plurality of first insulating elements extending between the first and second insulating frames, each first insulating element being fitted within a corresponding winding passage and configured to insulate the stator winding from the stator core, two side portions of each first insulating element extending along an inner surface of the winding passage adjacent the winding opening; and a plurality of second insulating elements extending between the first and second insulating frames, each second insulating element extending across the corresponding winding opening and having two side portions disposed between the first insulating element and the respective arm portion of the corresponding tooth.

Preferably, the first insulating frame comprises a plurality of first insulating arms respectively covering first axial end portions of the teeth, the second insulating frame comprises a plurality of second insulating arms respectively covering second axial end portions of the teeth, each first insulating arm comprises two first tabs extending circumferentially from an end portion thereof in opposite directions, each first tab forms an inclined surface facing the yoke of the stator core, the inclined surface comprises an end portion adjacent to the yoke of the stator core, the first insulating element bears against the end portion of the inclined surface to form a slot between the first insulating element and a surface of the first tab for insertion of the second insulating element.

Preferably, the inclined surface is formed by a protrusion formed on a surface the first tab facing towards the yoke of the stator core.

Preferably, a diameter of the protrusion gradually decreases in a direction from a radially inner end to a radially outer end.

Preferably, the protrusions have a shape selected from the group of a prism, pyramid, cone, cone frustum, hemisphere, bubble and a combination thereof Preferably, each first insulating arm further comprises two second tabs extending circumferentially from the end thereof in opposite directions, the second tabs are closer to a radial outer surface of the stator core than the first tabs and the second tabs cooperate with the first tabs to form a slot for insertion of the second insulating element.

Preferably, the second tabs are offset from the first tabs in the axial and radial directions of the stator core.

Preferably, each second insulating arm comprises two third tabs extending circumferentially from an end portion thereof in opposite directions, each third tab rests against a radial surface of the second insulating element.

Preferably, each third tab comprises a limiting element extending radially from an end portion thereof and supporting the axial end portion of the corresponding second insulating element.

Preferably, the motor includes a housing having a closed end and an open end closed by an end cap, the stator core is fitted to the housing and the rotor has a shaft attached to the housing by bearings mounted to the end cap and the closed end of the housing.

Preferably, the stator winding comprises a plurality of coils, each coil being wound about a corresponding single tooth of the stator core.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
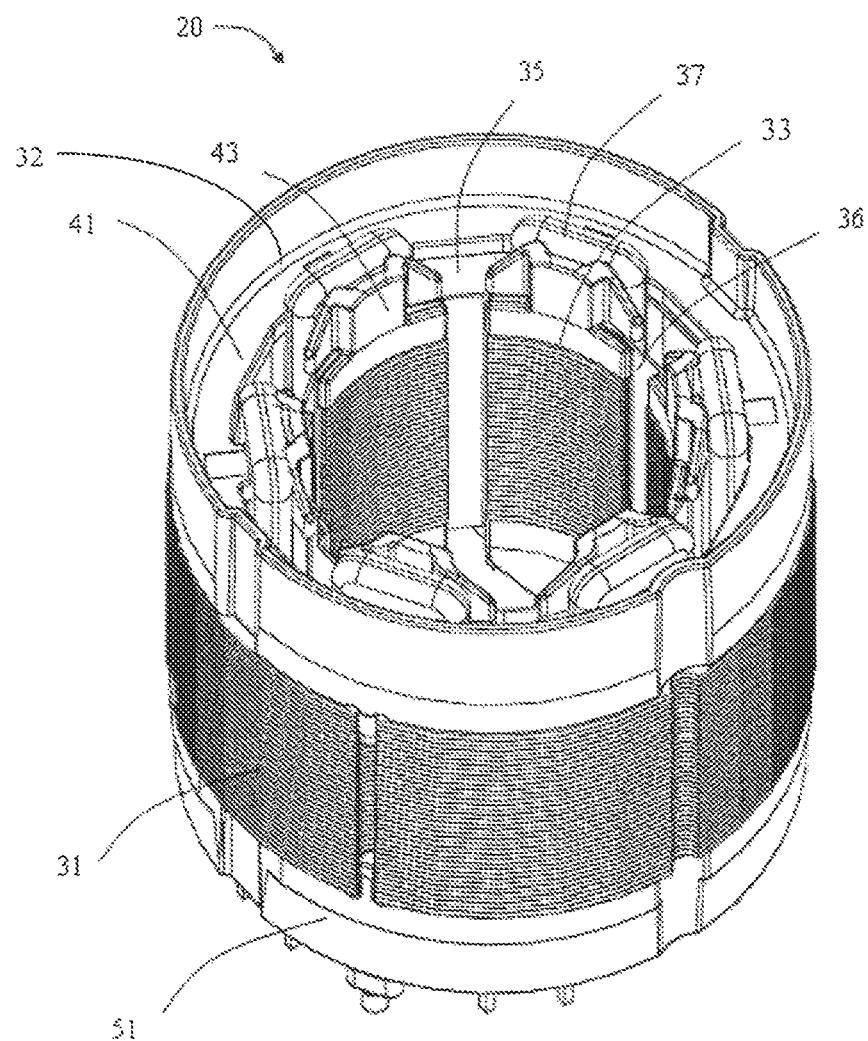
FIG. 1 illustrates a stator assembly according to the preferred embodiment of the present invention.
Figure 2:
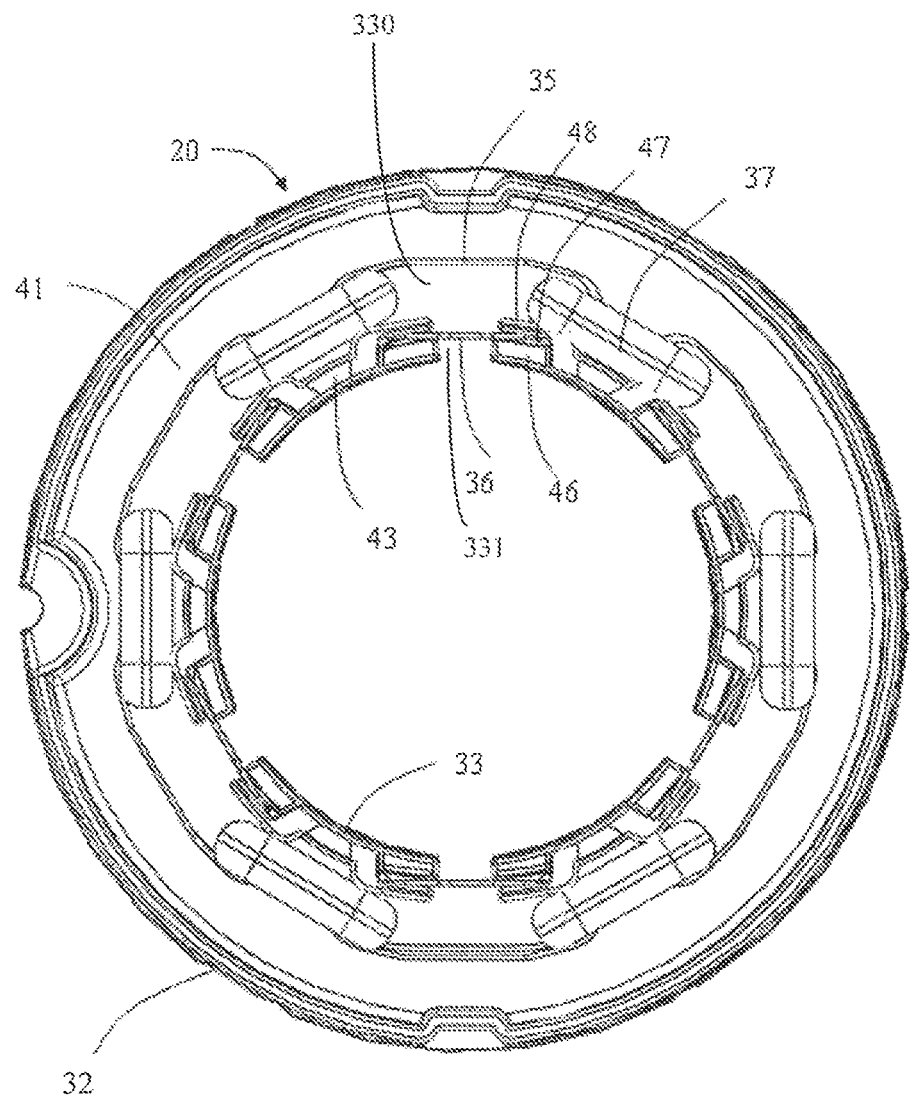
FIG. 2 is a top view of the stator assembly of FIG. 1.
Figure 3:
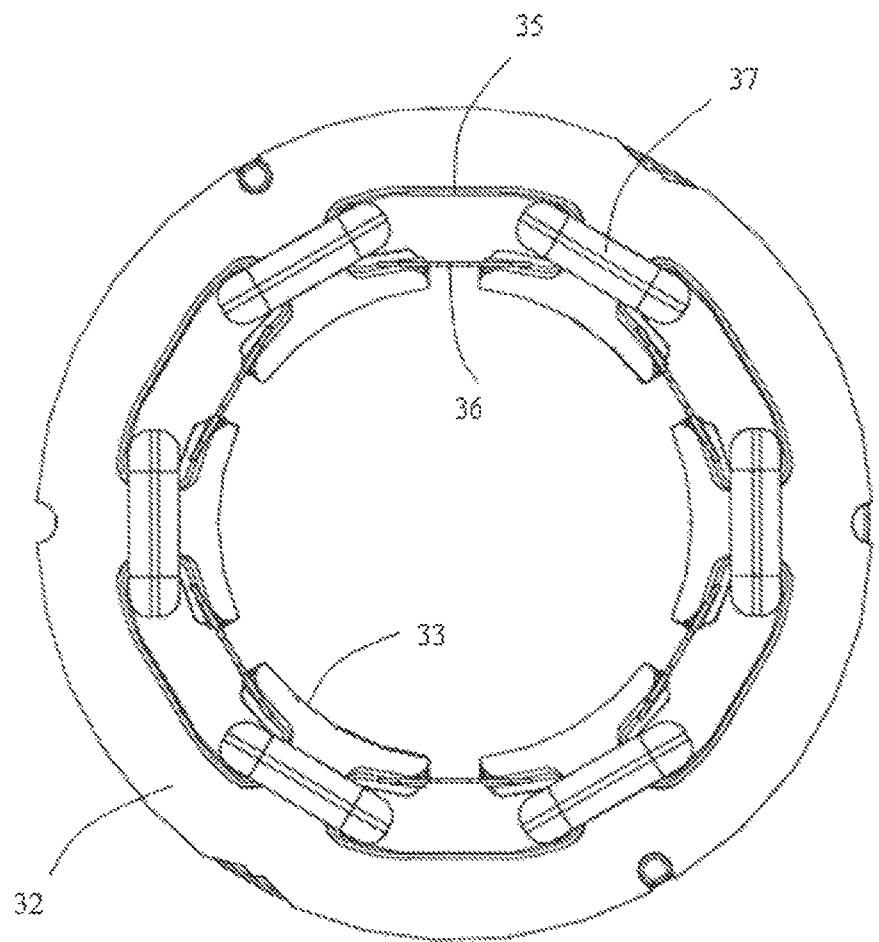
FIG. 3 is a top view of the stator assembly of FIG. 2 with two insulating frames removed.

FIGS. 1 to 3 illustrate a stator assembly 20 having a stator core 31, a number of coils forming the stator winding 37, a first insulating frame 41 and a second insulating frame 51 respectively assembled on opposite axial end portions of the stator core 31. The two axial end portions comprise a first axial end portion and a second axial end portion.

The stator core 31 includes a ring yoke 32 and a number of teeth 33 extending inwardly from the yoke 32. Each tooth 33 includes a base and two arm portions extending from the base and in opposite directions. A winding passage 330 is formed between each pair of adjacent teeth 33. Each winding passage has a winding opening 331 defined between opposing ends of adjacent arm portions of the two adjacent teeth 33.

The first insulating frame 41 is assembled on the first axial end portion of the stator core 31, and includes a first insulating yoke 42 (shown in FIG. 4) and a number of first insulating arms 43 inwardly extending from the first insulating yoke 42. In this embodiment, the shape of the first insulating yoke 42 is a ring. The first insulating yoke 42 covers a first axial end portion of the yoke 32 of the stator core 31, and the first insulating arms 43 respectively cover the corresponding first axial end portions of the teeth 33, thereby insulating the first axial end portions of the teeth 33 from the stator winding 37.

The second insulating frame 51 is assembled on the second axial end portion of the stator core 31, and includes a second insulating yoke 52 (shown in FIG. 6) and a number of second insulating arms 53 extending inwardly from the second insulating yoke 52. The second insulating yoke 52 covers the second axial end portion of the yoke 32 of the stator core 31, and the second insulating arms 53 respectively cover the corresponding second axial end portions of the teeth 33, thereby insulating the second axial end portions of the teeth 33 from the stator winding 37.

The stator winding 37 comprises a number of coils that are wound on the first insulating arms 43 and the second insulating arms 53 covering the teeth 33, and are received in the winding passages 330. The stator assembly 20 further includes a number of first insulating elements 35 each of which are received in a corresponding winding passage 330. Each first insulating element 35 tightly covers an inner surface of the corresponding winding passage 330. Two side portions of each first insulating element 35 extend to approach the corresponding winding opening 331. The first insulating elements 35 cooperate with the first insulating arms 43 and the second insulating arms 53 to insulate the stator core 31 from the stator windings 37. In this embodiment, the first insulating elements 35 may be insulating papers. In this embodiment, the two side portions of each first insulating element 35 should not extend beyond the winding opening 331, otherwise it will impact on the winding of the stator winding 37.

The stator assembly 20 further includes a number of second insulating elements 36 respectively closing the corresponding winding openings 331. Each second insulating element 36 is placed across the winding opening 331, from inside the winding passage. Two side portions of each second insulating element 36 are disposed between the two side portions of the first insulating element 35 and two adjacent arm portions of the two teeth 33, thereby enclosing the received portion of the stator winding 37 in the winding passage 330 by the first insulating element 35 and the second insulating element 36 and effectively extending the creepage distance between the stator windings 37 and the teeth 33. Preferably, the second insulating element 36 is a plastic sheet.

Figure 4:
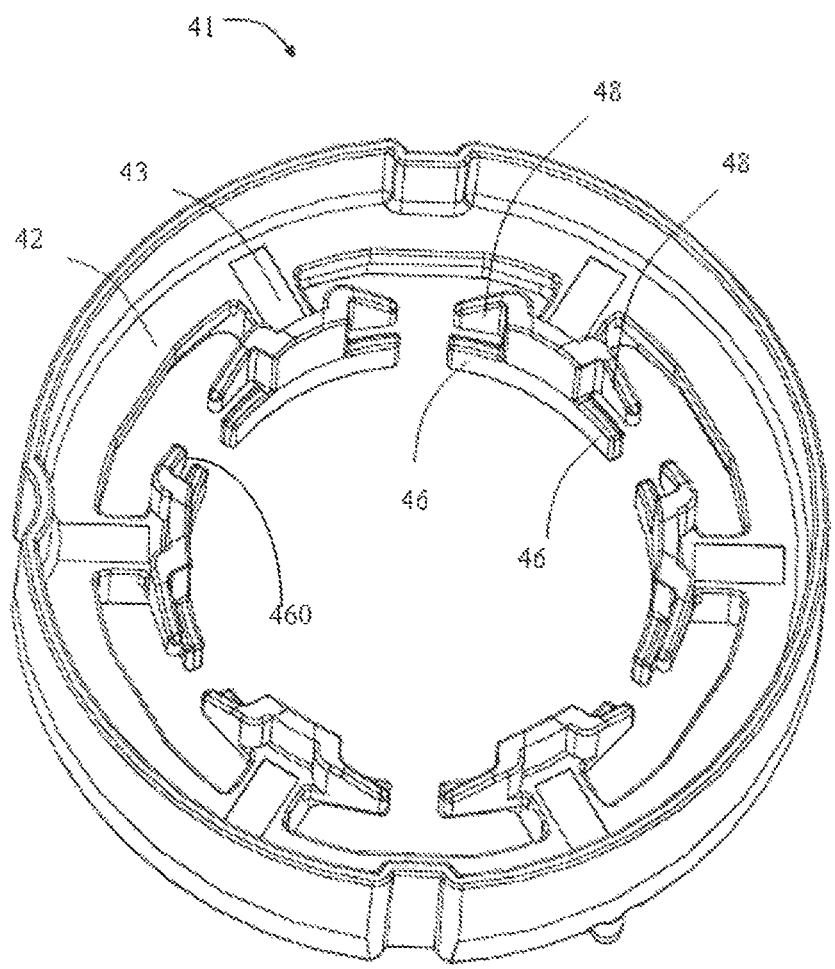
FIG. 4 illustrates a first insulating frame of the stator assembly of FIG. 1; viewed from above.
Figure 5:
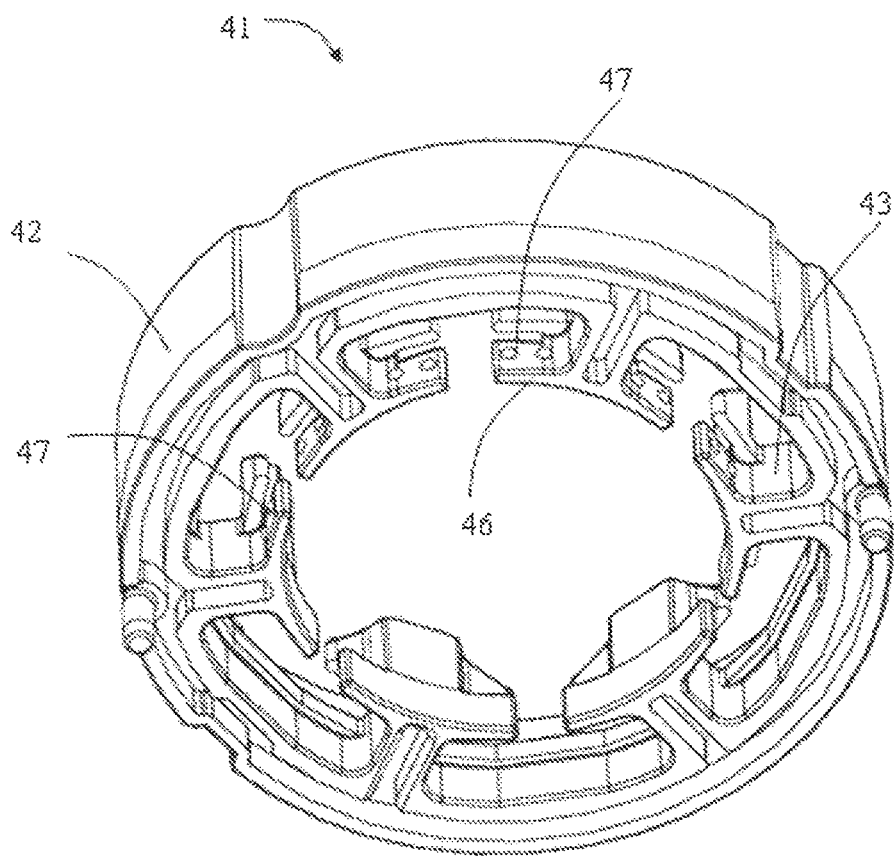
FIG. 5 illustrates the first insulating frame viewed from below.

Referring to FIGS. 4 & 5, each first insulating arm 43 includes two first tabs 46 circumferentially extending from the end portion thereof and towards two opposite directions. Each first tab 46 includes a surface facing the yoke 42 and from which a protrusion 47 protrudes. The end portion of the first insulating element 43 rests against the protrusion 47 to form a slot 460 between the first insulating element 43 and a surface of the first tab 46 facing the yoke 42. The second insulating element 36 is inserted into the slot 460 to close the winding opening 331. After the second insulating element 36 is inserted into the slot 460, the two axial end portions of the second insulating element 36 are clamped between the first insulating element 35 and the protrusion 47. Optionally, in another embodiment, the two protrusions 47 will only bare against the first insulating element 35 when a circumferential width of the second insulating element 36 is less than or equal to a circumferential distance between the two protrusions 47 positioned on either side of the winding passage 330, and a radial thickness of the second insulating element 36 is less than or equal to a radial height of the protrusion 47.

Furthermore, each first insulating arm 43 further includes two second tabs 48 circumferentially extending from the end portion thereof in opposite directions. In this embodiment, the second tab 48 is closer to a radial outer surface of the stator core than the first tab 46, thereby forming a slot 460 between the second tab 48 and the first tab 46 into which the second insulating element 36 is inserted.

Furthermore, the first tab 46 and the second tab 48 are staggerly arranged in an axial direction and a radial direction of the stator core 31. The advantage of the above arrangement of the first tab 46 and the second tab 48 is that the first insulating frame 41 can be integrally formed with the first tab 46 and the second tab 48 as a single piece molding.

Furthermore, as shown in FIG. 1, the two tabs 48 are integrally formed as a single piece molding and axially protrude from the first insulating arm 43, thereby increasing the creepage distance from the axial end portion of the stator winding 37 to the radial inner surface of the teeth 33.

Figure 9:
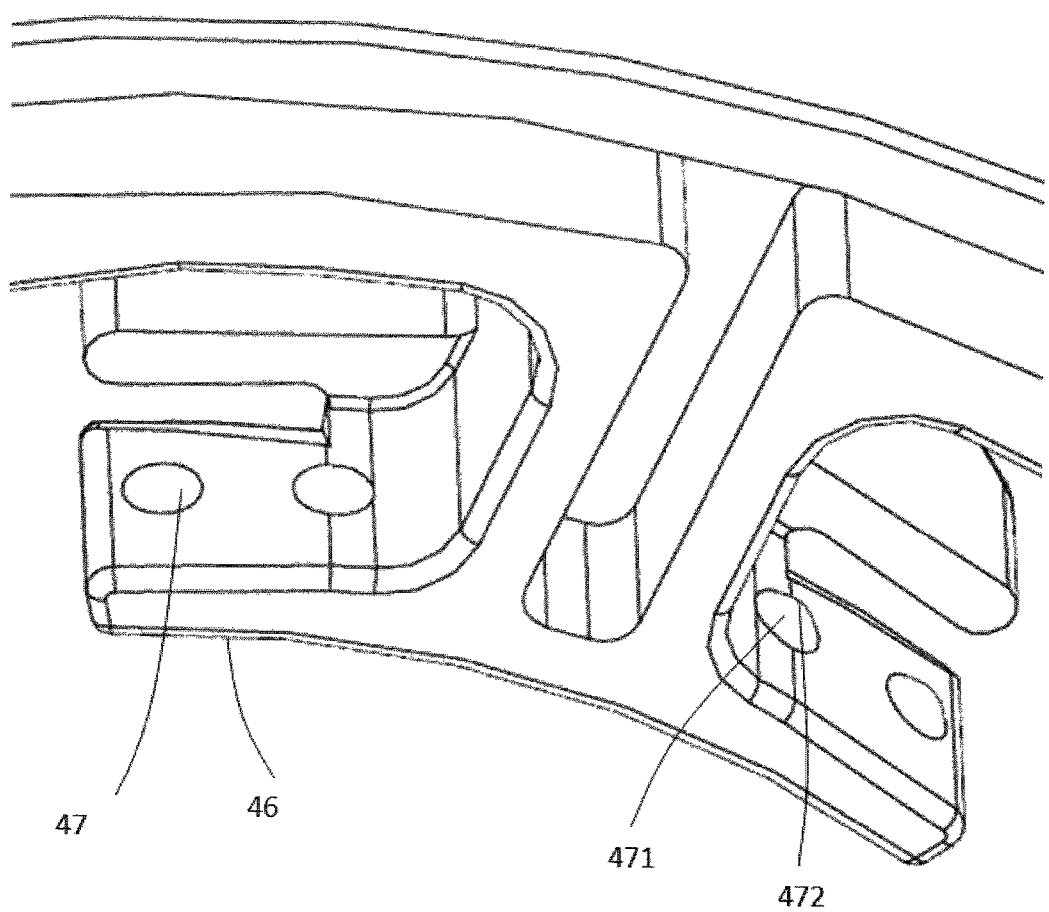
FIG. 9 shows an enlarged view of the first insulating arm of FIG. 5.

Moreover, due to the purpose of the protrusion 47 is to provide the slot 460 between the first insulating element 35 and the first tab 46 for insertion of the second insulating element 36, the diameter of the protrusion 47 gradually decreases in the radial direction of the stator core 31, thereby forming an inclined guiding surface 471 (see FIG. 9). For example, the shape of the protrusion 47 may be, but not limited to, prism, pyramid, cone, cone frustum, hemisphere or bubble. Furthermore, a radial outward surface of the first tab 46 can be directly set as an inclined surface instead of the inclined guiding surface formed by the protrusion 47. The inclined surface 471 includes a first end portion 472 facing the yoke and the first end portion 472 bears against the first insulating element 35 to form a separation or slot between the first tab 46 and the first insulating element 35 to facilitate easy inserting of the second insulating element 36 between the first tab 46 and the first insulating element 35.

Furthermore, the number of the protrusions 47 protruding from each first tab 46 may be equal to or more than one. In the embodiment illustrated, two protrusions 47 protrude from each first tab 46.

Figure 6:
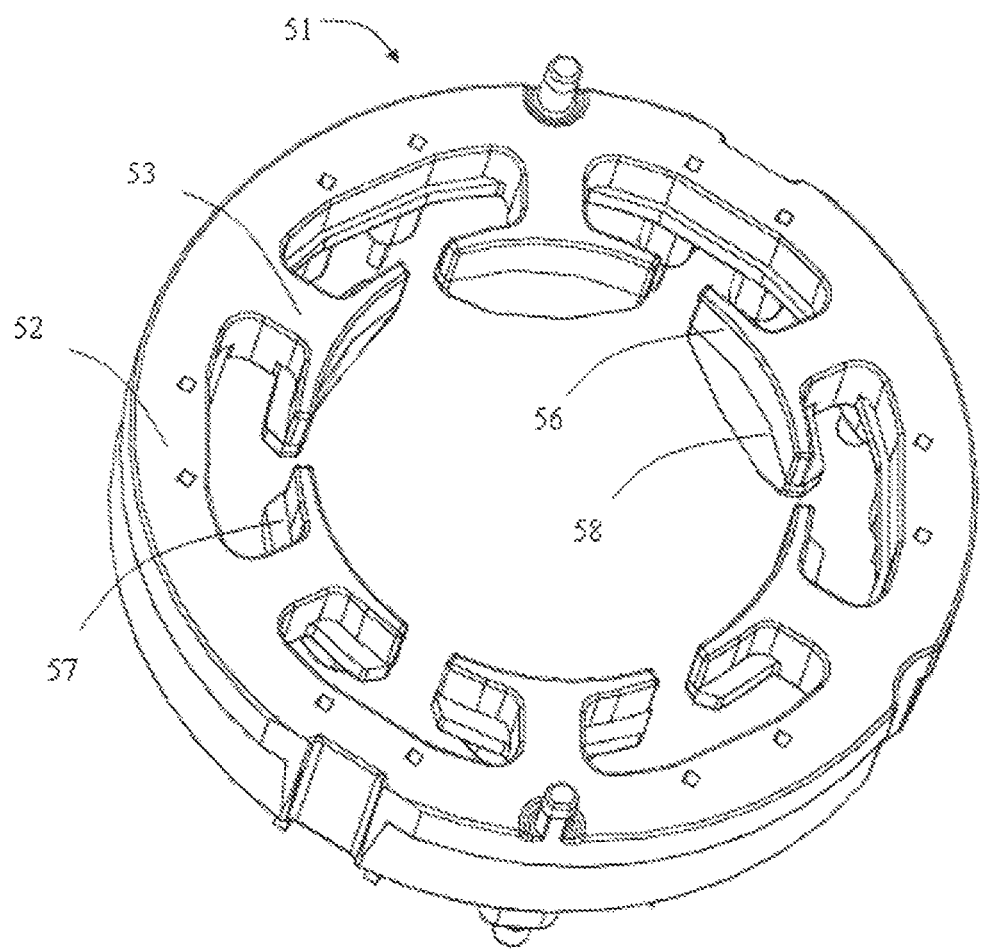
FIG. 6 illustrates a second insulating frame of the stator assembly of FIG. 1, viewed from above.
Figure 7:
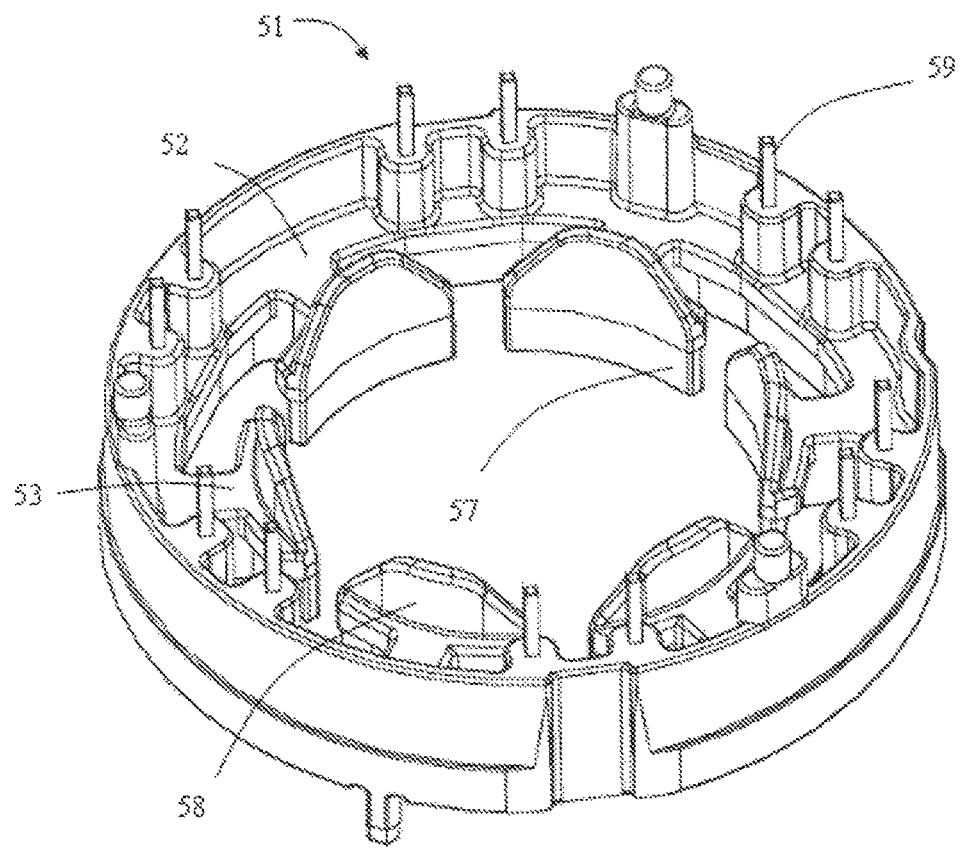
FIG. 7 illustrates the second insulating frame viewed from below.

Referring to FIGS. 6 & 7, each second insulating arm 53 includes two third tabs 56 circumferentially extending from an end portion thereof and in opposite directions. Each third tab 56 includes a limiting element 57 radially protruding from an end portion thereof and for supporting the axial end portion of the second insulating element 36. That is, during assembling, it indicates that the second insulating element 36 is assembled in a correct position when the second insulating element 36 is inserted into the slot 460 and resisted by the limiting element 57. In this embodiment, the limiting element 57 is a flange or a step extending from the third tab 56.

Furthermore, referring to FIG. 6 again, in order to increase the creepage distance from the axial end portion of the stator winding 37 to the radial inner surface of the teeth 33, the second insulating arm 53 includes a flange 58 axially extending from an end portion thereof.

Furthermore, the second insulating frame 51 further includes a number of terminals 59 which are electrically connected to the stator winding 37. Alternatively, terminals 59 can also set on the first insulating frame 41.

Figure 8:
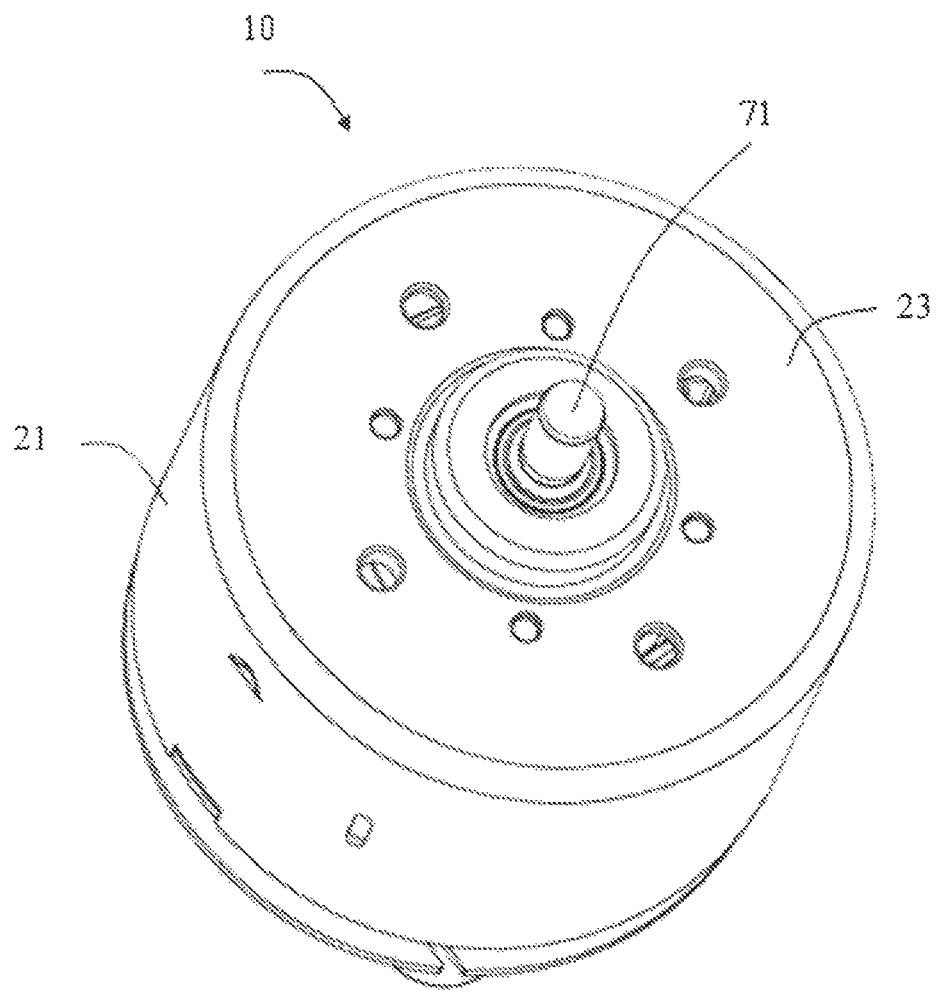
FIG. 8 shows an electric motor incorporating the stator assembly of FIG. 1.

Referring to FIG. 8, an electric motor 10 is shown. The electric motor 10 includes a stator and a rotor. The stator includes a housing 21 and the above stator assembly 20. The stator assembly 20 is assembled within the housing 21 which is preferably is a deep drawn, cup-shaped housing. A bottom 23 of the housing 21 can be as an end cap of the stator. The rotor includes a shaft 71, and a rotor core fixed to the shaft 71. The shaft 71 is rotatably connected to the end cap by a bearing, thereby allowing the rotor to rotate relative to the stator.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An electric motor having a stator and a rotor rotatable with respect to the stator, the stator comprising:
   a stator core comprising a yoke, a plurality of teeth extending inwardly from the yoke, each tooth comprising a base and two arm portions circumferentially extending from an end portion of the base in opposite directions, a plurality of winding passages, each winding passage being formed between a respective pair of adjacent teeth and having a winding opening between two adjacent arm portions of the adjacent teeth;
   a stator winding being wound about the bases of the teeth and received in the winding passages;
   a first insulating frame assembled on a first axial end portion of the stator core;
   a second insulating frame assembled on a second axial end portion of the stator core;
   a plurality of first insulating elements extending between the first and second insulating frames, each first insulating element being fitted within a corresponding winding passage and configured to insulate the stator winding from the stator core, two side portions of each first insulating element extending along an inner surface of the winding passage adjacent the winding opening; and
   a plurality of second insulating elements extending between the first and second insulating frames, each second insulating element extending across the corresponding winding opening and having two side portions disposed between the first insulating element and the respective arm portion of the corresponding tooth,.
   wherein the first insulating frame comprises a plurality of first insulating arms respectively covering first axial end portions of the teeth, the second insulating frame comprises a plurality of second insulating arms respectively covering second axial end portions of the teeth, each first insulating arm comprises two first tabs extending circumferentially from an end portion thereof in opposite directions, each first tab forms an inclined surface facing the yoke of the stator core, the inclined surface comprises an end portion adjacent to the yoke of the stator core, the first insulating element bears against the end portion of the inclined surface to form a slot between the first insulating element and a surface of the first tab for insertion of the second insulating element.

2. The motor of claim 1, wherein the inclined surface is formed by a protrusion formed on a surface the first tab facing towards the yoke of the stator core.

3. The motor of claim 2, wherein a diameter of the protrusion gradually decreases in a direction from a radially inner end to a radially outer end.

4. The motor of claim 3, wherein the protrusions have a shape selected from the group of a prism, pyramid, cone, cone frustum, hemisphere, bubble and a combination thereof.

5. The motor of claim 1, wherein each first insulating arm further comprises two second tabs extending circumferentially from the end thereof in opposite directions, the second tabs are closer to a radial outer surface of the stator core than the first tabs and the second tabs cooperate with the first tabs to form a slot for insertion of the second insulating element.

6. The motor of claim 5, wherein the second tabs are offset from the first tabs in the axial and radial directions of the stator core.

7. The motor of claim 1, wherein each second insulating arm comprises two third tabs extending circumferentially from an end portion thereof in opposite directions, each third tab rests against a radial surface of the second insulating element.

8. The motor of claim 7, wherein each third tab comprises a limiting element extending radially from an end portion thereof and supporting the axial end portion of the corresponding second insulating element.

9. The motor of claim 1, further comprising a housing having a closed end and an open end closed by an end cap, the stator core is fitted to the housing and the rotor has a shaft attached to the housing by bearings mounted to the end cap and the closed end of the housing.

10. The motor of claim 1, wherein the stator winding comprises a plurality of coils, each coil being wound about a corresponding single tooth of the stator core.

* * * * *